US012724131B2

(12) United States Patent
Zhu et al.

(10) Patent No.: US 12,724,131 B2
(45) Date of Patent: Sep. 1, 2026

(54) LIDAR AND RANGING METHOD

(71) Applicant: HESAI TECHNOLOGY CO., LTD., Shanghai (CN)

(72) Inventors: Xuezhou Zhu, Shanghai (CN); Kaimin Yan, Shanghai (CN); Haihua Liu, Shanghai (CN); Shaoqing Xiang, Shanghai (CN)

(73) Assignee: HESAI TECHNOLOGY CO., LTD., Shanghai (CN)

( * ) Notice: Subject to any disclaimer, the term of this patent is extended or adjusted under 35 U.S.C. 154(b) by 922 days.

(21) Appl. No.: 18/067,302

(22) Filed: Dec. 16, 2022

(65) Prior Publication Data

US 2023/0119371 A1 Apr. 20, 2023

Related U.S. Application Data

(63) Continuation of application No. PCT/CN2020/112206, filed on Aug. 28, 2020.

(51) Int. Cl.
*G01S 7/487* (2006.01)
*G01S 7/481* (2006.01)
(Continued)

(52) U.S. Cl.
CPC ............ *G01S 7/487* (2013.01); *G01S 7/4816* (2013.01); *G01S 7/4817* (2013.01); *G01S 7/4865* (2013.01); *G01S 17/10* (2013.01)

(58) Field of Classification Search
CPC ...... G01S 7/487; G01S 7/4816; G01S 7/4817; G01S 7/4865; G01S 17/10; G01S 7/4811;
(Continued)

(56) References Cited

U.S. PATENT DOCUMENTS 5,142,416 A * 8/1992 Nakamura .............. G01S 17/04 359/742
2004/0212489 A1* 10/2004 Chan .................... B60Q 1/2665 340/475
(Continued)

FOREIGN PATENT DOCUMENTS

CN 2779424 Y 5/2006
CN 103620799 A * 3/2014 ............ G01S 7/4811
(Continued)

OTHER PUBLICATIONS

First Office Action mailed May 5, 2022, in connection with Chinese Patent Application No. 202010885895.7, 11 pgs. (including translation).

(Continued)

*Primary Examiner* — Michael Lee
(74) *Attorney, Agent, or Firm* — Chiesa Shahinian & Giantomasi PC; Xuezheng Wang

(57) ABSTRACT

A lidar is provided, including: an emitting unit, including a plurality of laser emitters and driving circuits, where the driving circuits are configured to drive the laser emitters to emit detection laser beams for detecting a target object, the emitting unit further includes a compensation unit for a blind region, and the compensation unit for a blind region is configured to cause a target object within a short range of the lidar to receive the detection laser beams and cause reflected echoes to be received by detectors; a receiving unit, including a plurality of detectors, where the detectors are configured to receive echoes of the detection laser beams reflected by the target object and to convert the echoes into electrical signals; and a processing unit, coupled to the receiving unit and configured to receive the electrical signals for calculating the distance and/or reflectivity of the target object.

18 Claims, 16 Drawing Sheets

(51) Int. Cl.
*G01S 7/4865* (2020.01)
*G01S 17/10* (2020.01)

(58) Field of Classification Search
CPC .... G01S 7/4802; G01S 7/4813; G01S 7/4815; G01S 7/484; G01S 7/4863; G01S 7/4814; H01S 5/183; G01J 2001/446
See application file for complete search history.

(56) References Cited

U.S. PATENT DOCUMENTS

| | | | | |
|---|---|---|---|---|
| 2007/0181810 | A1 | 8/2007 | Tan et al. | |
| 2008/0007711 | A1 | 1/2008 | Liu | |
| 2014/0349089 | A1 | 11/2014 | Ueyama et al. | |
| 2017/0307758 | A1 | 10/2017 | Pei et al. | |
| 2018/0081036 | A1 | 3/2018 | Miremadi | |
| 2018/0292532 | A1 | 10/2018 | Meyers et al. | |
| 2019/0011556 | A1 | 1/2019 | Pacala et al. | |
| 2020/0025882 | A1* | 1/2020 | Watanabe | G01S 17/10 |
| 2020/0150237 | A1 | 5/2020 | Qiu et al. | |
| 2020/0355796 | A1 | 11/2020 | Qiu et al. | |
| 2021/0382147 | A1 | 12/2021 | Chen et al. | |
| 2022/0260677 | A1 | 8/2022 | Yang et al. | |

FOREIGN PATENT DOCUMENTS

| | | | | |
|---|---|---|---|---|
| CN | 108267751 | A * | 7/2018 | G01S 7/484 |
| CN | 109709575 | A | 5/2019 | |
| CN | 109991617 | A | 7/2019 | |
| CN | 111090082 | A | 5/2020 | |
| DE | 102016208713 | A1 | 11/2017 | |
| JP | H0514968 | U | 2/1993 | |
| JP | H05215839 | A | 8/1993 | |
| JP | H07306260 | A | 11/1995 | |
| JP | 2007214564 | A | 8/2007 | |
| JP | 6103486 | B2 | 3/2017 | |
| JP | 2018520371 | A | 7/2018 | |
| JP | 2018179984 | A | 11/2018 | |
| JP | 2019521314 | A | 7/2019 | |
| KR | 20200024914 | A | 3/2020 | |

OTHER PUBLICATIONS

Notice of Preliminary Rejection mailed May 9, 2025, in connection with Korean Patent Application No. 10-2022-7046187, 18 pgs. (including translation).

International Search Report and Written Opinion mailed Apr. 25, 2021, in connection with International Patent Application No. PCT/CN2020/112206, 11 pgs. (including translation).

Notice of Reasons for Refusal mailed Feb. 20, 2024 in connection with Japanese Patent Application No. 2022-578743, 15 pgs. (including translation).

* cited by examiner

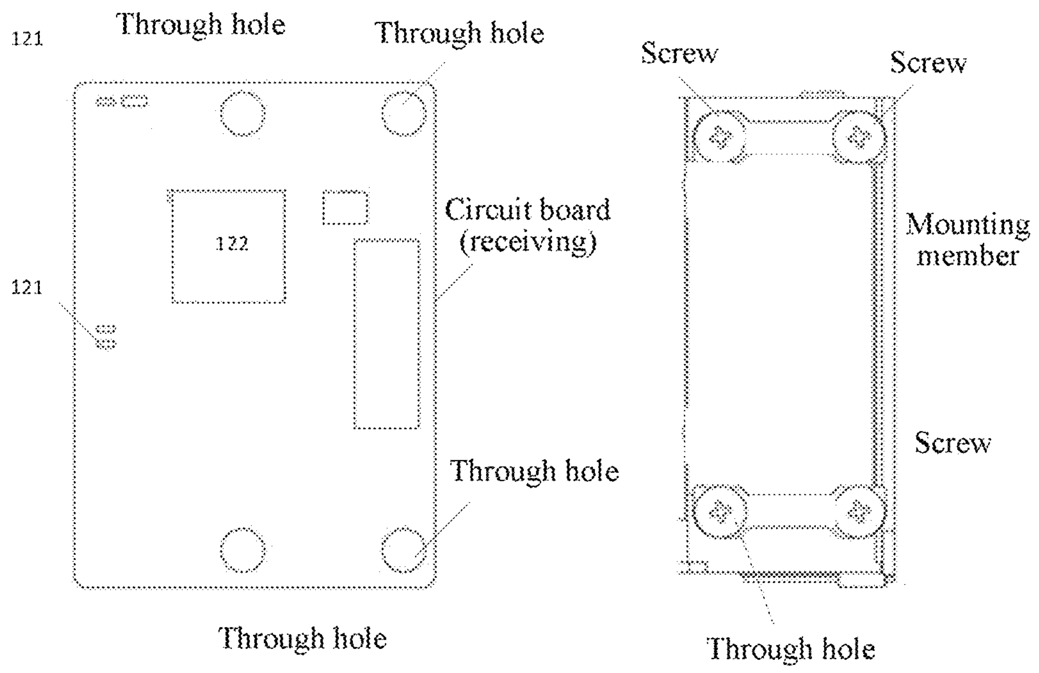
FIG. 15A
FIG. 15B
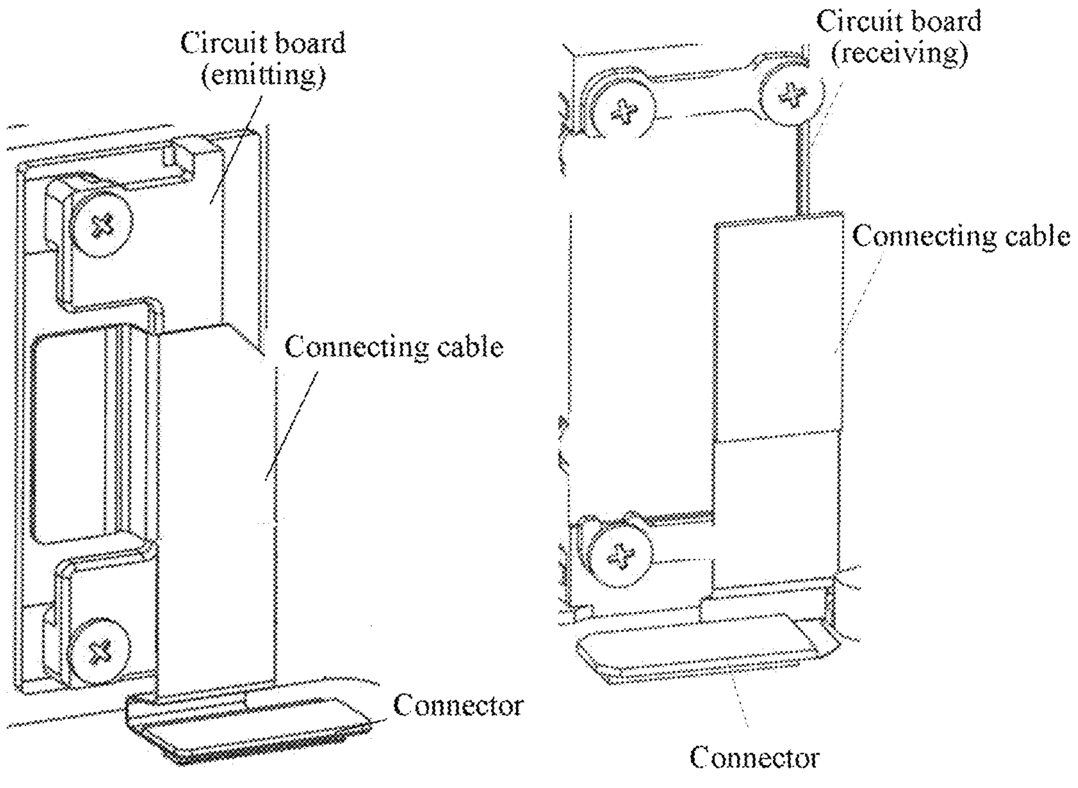
FIG. 16A
FIG. 16B

LIDAR AND RANGING METHOD

CROSS-REFERENCE TO RELATED APPLICATIONS

This application is a Continuation of International Patent Application No. PCT/CN2020/112206, filed Aug. 28, 2020; the disclosure of which is incorporated herein by reference in its entirety.

TECHNICAL FIELD

The present disclosure relates to the field of photoelectric detection, and specifically, to a lidar and a ranging method using the lidar.

BACKGROUND

As a common ranging sensor, a lidar has the characteristics of long detection distance, high resolution, and low environmental interference, and has been widely applied to the fields such as intelligent robots, unmanned aerial vehicles, or unmanned driving. A working principle of the lidar is to evaluate a distance by measuring time of flight (TOF) taken by detection laser beams to travel back and forth between the lidar and a target.

According to a conventional mechanical rotary lidar, a set of emitting lenses emits an emitted light after reflection by a reflector twice, and then the emitted light is incident on an external target object and reflected. An echo passes through a set of receiving lenses, is reflected by the reflector twice and then received by a detector, and then is processed by subsequent digital signal processing. By calculating the TOF, information of a distance between the external target object and the lidar is obtained.

In addition, a conventional lidar is a bistatic optical system. To detect a long-distance target, a laser emitting beam is aligned with a field of view of a detector at a long distance (for example, 200 m). As shown in FIG. 1A, the laser emitting beam and the field of view of the detector are not overlapped within a specific distance range from the lidar. Therefore, in this distance range, the detector of the lidar cannot receive signal light reflected by a target obstacle or received signal light is extremely weak, which is a short-range blind region. The existence of the short-range blind region or the weak signal of the lidar in a short range from a non-coaxial optical path structure, that is, a laser emitting path and a signal receiving path do not completely overlap to form a coaxial optical path structure. Referring to FIG. 1A, there is horizontal translation between an emitting lens and a receiving lens.

There are two explanations for the generation of the short-range blind region:

A first explanation: Referring to FIG. 1A, the short-range blind region is a region where an emitted laser beam does not overlap a receiving field of view at a short distance. This means that the detector of the lidar "cannot see" the emitted laser beam in this region, that is, the detector cannot receive signal light reflected from a target in this region, and thus cannot generate a point cloud map of an obstacle in this region.

A second explanation: Referring to FIG. 1B, if there is a target in the short-range blind region, an image point formed from the signal light reflected by the target in the short-range blind region through the receiving lens is not on a focal plane of the receiving lens, but behind the focal plane. In addition, because the target in the short-range blind region is above an optical axis of the receiving lens, the image point formed from the target through the receiving lens is surely below the optical axis of the receiving lens. Considering the two explanations, relative positions of a focal point of reflected lights by the target in the short-range blind region and the detector are shown in FIG. 1B. The detector of the lidar receives no reflection signal from the target in the short-range blind region of the lidar.

The conventional lidar has a large short-range blind region (for example, >5 m), and a target object in the blind region (0-5 m) cannot be detected by the lidar, which causes a safety hazard to a product using the lidar.

Moreover, in the conventional lidar, a laser emitter at an emitting unit and a driving circuit of the laser emitter are arranged on different circuit boards, and even mounted on different components, so a wire connected to each other is long and a signal loss is high. A detector at a receiving unit and an analog front-end circuit required for the detector are also arranged on different circuit boards, and even mounted on different components, which also have similar loss problems. For the lidar, a high-precision ranging system, these signal losses are also very important.

The content of the background section is merely technologies known to the inventor, and does not represent existing technologies in the field.

SUMMARY

In view of at least one problem existed in the related art, the present invention provides a lidar. The lidar includes: an emitting unit, including a plurality of laser emitters and driving circuits, where the driving circuits are configured to drive the laser emitters to emit detection laser beams for detecting a target object, the emitting unit further includes a compensation unit for a blind region, and the compensation unit for a blind region is configured to cause a target object within a short range of the lidar to receive the detection laser beams and cause reflected echoes to be received by detectors; a receiving unit, including a plurality of detectors, where the detectors are configured to receive echoes of the detection laser beams reflected by the target object and to convert the echoes into electrical signals; and a processing unit, coupled to the receiving unit and configured to receive the electrical signals for calculating the distance and/or reflectivity of the target object.

The present invention further provides a ranging method by using a laser. The method includes:

emitting detection laser beams through an emitting unit including a plurality of laser emitters and driving circuits;

changing directions of the detection laser beams through a compensation unit for a blind region so that a target object within a short range can receive the detection laser beams and reflected echoes can be received by detectors;

receiving echoes from the target object through a plurality of detectors, converting the echoes into electrical signals, and reading the electrical signals outputted by the detectors through analog front-end components; and calculating the distance and/or reflectivity of the target object according to the electrical signals.

BRIEF DESCRIPTION OF THE DRAWINGS

The drawings forming a part of the present disclosure are used to provide further understanding of the present disclosure, and the exemplary embodiments and description of the present disclosure are used to explain the present disclosure but do not constitute an improper limitation on the present disclosure. In the accompanying drawings:

FIG. 15A and FIG. 15B are schematic diagrams of mounting a PCB circuit board in which a detector and an analog front-end circuit are mounted in a receiving unit of a lidar;

FIG. 16A and FIG. 16B are respectively schematic diagrams of a back surface of a PCB circuit board of an emitting unit and a back surface of a PCB circuit board of a receiving unit of a lidar;

DETAILED DESCRIPTION

Figure 1A:
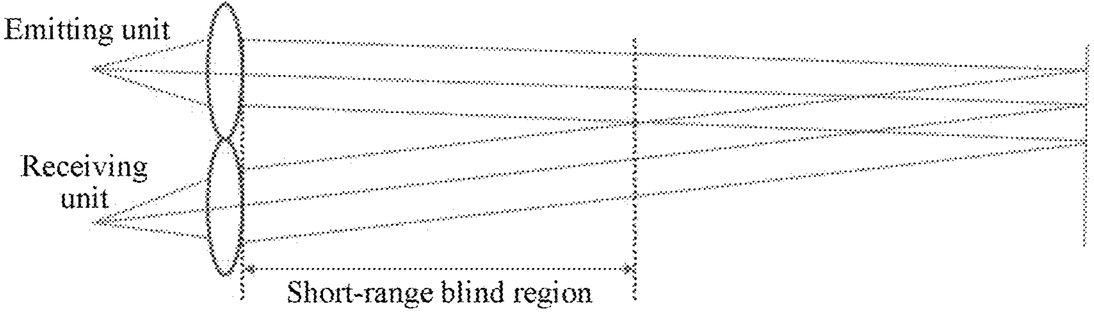
FIG. 1A and FIG. 1B are schematic diagrams of possible factors for generating a short-range blind region.

Only some exemplary embodiments are briefly described below. As those skilled in the art can realize, the described embodiments may be modified in various different ways without departing from the spirit or the scope of the present invention. Therefore, the accompanying drawings and the description are to be considered as illustrative in nature but not restrictive.

In the description of the present invention, it should be understood that directions or location relationships indicated by terms "center", "longitudinal", "transverse", "length", "width", "thickness", "upper", "lower", "front", "rear", "left", "right", "vertical", "horizontal", "top", "bottom", "inner", "outer", "clockwise", and "counterclockwise" are directions or location relationships shown based on the accompanying drawings, are merely used for the convenience of describing the present invention and simplifying the description, but are not used to indicate or imply that an apparatus or an element needs to have a particular direction or needs to be constructed and operated in a particular direction, and therefore, cannot be understood as a limitation to the present invention. In addition, terms "first" and "second" are used merely for the purpose of description, and shall not be construed as indicating or implying relative importance or implying a quantity of indicated technical features. Therefore, a feature restricted by "first" or "second" may explicitly indicate or implicitly include one or more such features. In the descriptions of the present invention, unless otherwise explicitly specified, "multiple" means two or more than two.

In the description of the present invention, it should be noted that, unless otherwise explicitly specified or defined, the terms such as "mount", "connect", and "connection" should be understood in a broad sense. For example, the connection may be a fixed connection, a detachable connection, or an integral connection; a mechanical connection, an electrical connection, mutual communication, or the connection may be a direct connection, an indirect connection through an intermediate medium, internal communication between two components, or an interaction relationship between two components. A person of ordinary skill in the art may understand specific meanings of the foregoing terms in the present invention according to specific situations.

In the present invention, unless otherwise explicitly stipulated and restricted, that a first feature is "on" or "under" a second feature may include that the first and second features are in direct contact, or may include that the first and second features are not in direct contact but in contact by using other features therebetween. In addition, that the first feature is "on", "above", or "over" the second feature includes that the first feature is right above and on the inclined top of the second feature or merely indicates that a level of the first feature is higher than that of the second feature. That the first feature is "below", "under", or "beneath" the second feature includes that the first feature is right below and at the inclined bottom of the second feature or merely indicates that a level of the first feature is lower than that of the second feature.

Many different implementations or examples are provided in the following disclosure to implement different structures of the present invention. To simplify the disclosure of the present invention, components and settings in particular examples are described below. Certainly, they are merely examples and are not intended to limit the present invention. In addition, in the present invention, reference numerals and/or reference letters may be repeated in different examples. The repetition is for the purposes of simplification and clearness, and a relationship. Moreover, the present invention provides examples of various particular processes and materials, but a person of ordinary skill in the art may be aware of application of another process and/or use of another material.

Preferred embodiments of the present invention are described below in detail with reference to the accompanying drawings. It should be understood that the preferred embodiments described herein are merely used to explain the present invention but are not intended to limit the present invention.

Figure 1B:
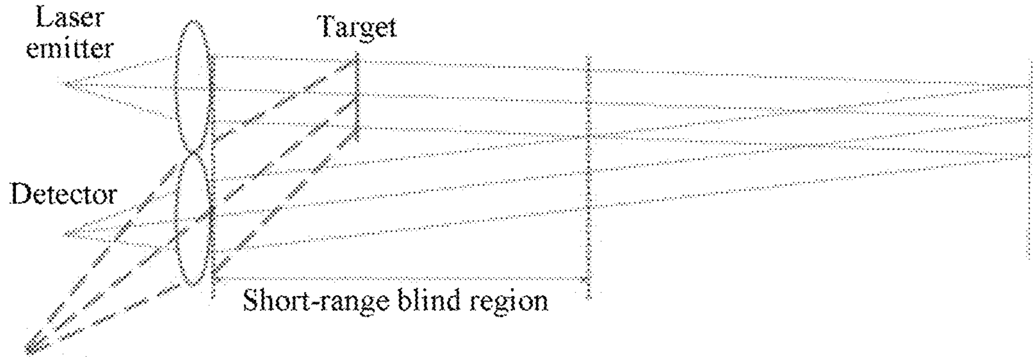
Figure 1C:
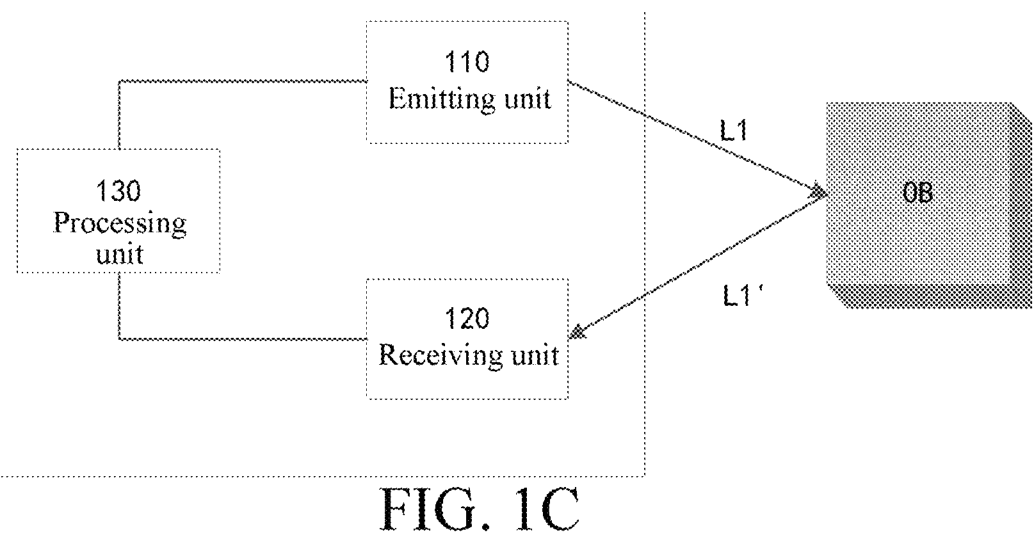
FIG. 1C shows a lidar according to an embodiment of the present invention.
Figure 1D:
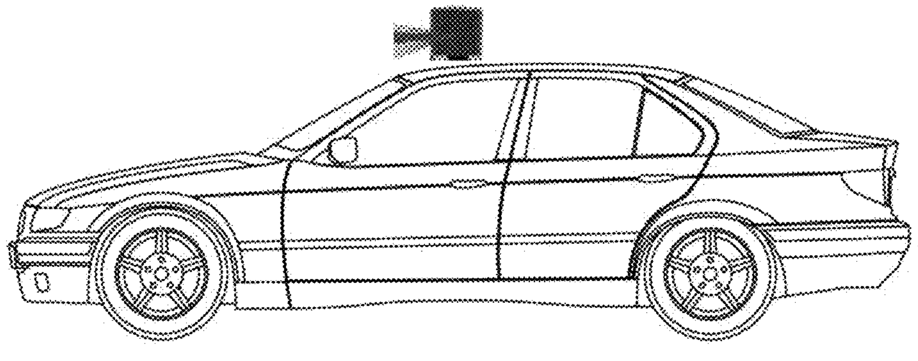
FIG. 1D shows an application scenario of a lidar according to an embodiment of the present invention.

FIG. 1C shows a lidar 100 according to an embodiment of the present invention. The lidar may be used in various fields, such as unmanned driving, V2X, robotic vacuum cleaner, and logistics trolley. FIG. 1D shows an application scenario of a lidar according to an embodiment of the present invention. The description is made in detail below with reference to the accompanying drawings.

Figure 3A:
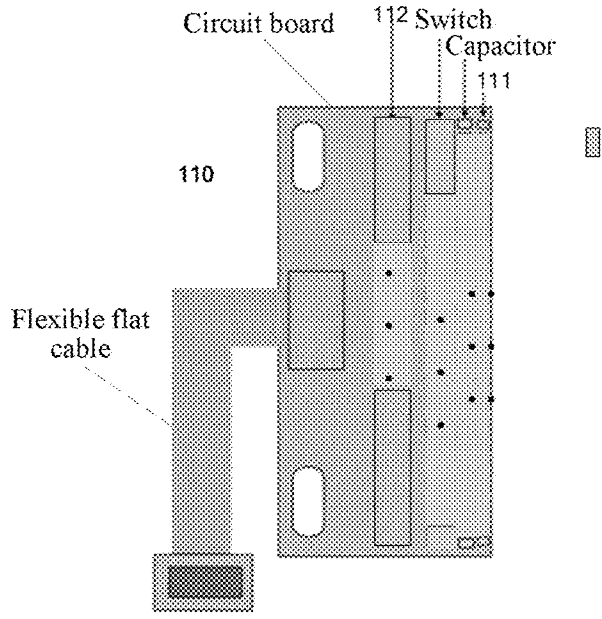
FIG. 3A shows an emitting unit according to an embodiment of the present invention.

As shown in FIG. 1C, the lidar 100 includes an emitting unit 110, a receiving unit 120, and a processing unit 130. The emitting unit 110 includes a plurality of laser emitters 111 and driving circuits 112 (as shown in FIG. 3A). The driving circuits are configured to drive the laser emitters to emit detection laser beams L1, to detect a target object. The laser emitter may be an edge-emitting laser (eel) emitter, or a vertical-cavity surface-emitting laser (vcsel) emitter, or even a combination of eel and vcsel. In a specific light emitting method, the laser emitters may emit light one by one in a certain sequence (to reduce crosstalk), or some or all of the laser emitters may emit light at the same time. In operation, for example, the laser emitters need to apply a high voltage, and on/off of the laser emitter may be controlled through a switch circuit. The driving circuit may be configured to apply the high voltage and on/off control required for normal operation of the laser emitter, so as to control light-emitting time and duration of the laser emitter, to cooperate to meet a requirement of detecting a distance for a lidar, and take into account an index of eye safety. The present invention does not involve a specific structure of the driving circuit, so the structure of the driving circuit is not described in detail.

Figure 3B:
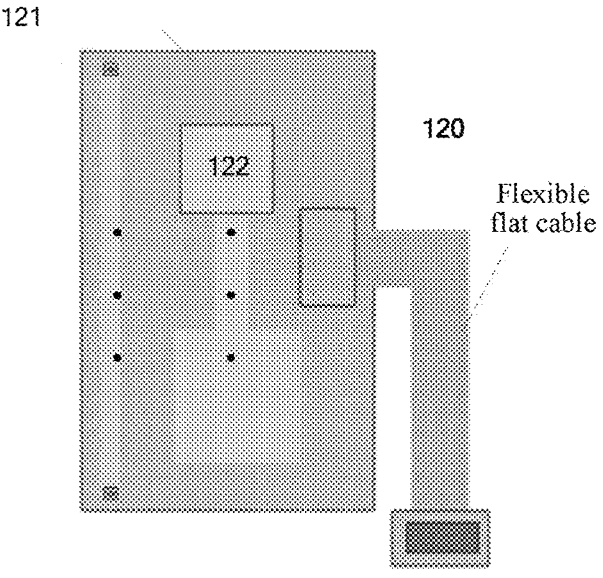
FIG. 3B shows a detection unit according to an embodiment of the present invention.

The receiving unit 120 includes one or more detectors 121 and analog front-end components 122 (as shown in FIG. 3B). The detector is configured to be capable of receiving an echo L1' of the detection laser beam L1 reflected by the target object and converting the echo L into an electrical signal. The analog front-end component 122 is coupled to the detector 121, and configured to read and amplifying the electrical signal outputted by the detector. According to an embodiment of the present invention, the detector may include an avalanche photodiode (APD). A signal outputted by the APD is an analog signal and is generally weak, so the analog front-end component 122 may include an analog-to-digital converter (ADC) and an optional signal amplifying circuit, and is configured to convert the analog signal outputted by the APD into a digital signal and to amplify the digital signal, to facilitate subsequent digital signal processing. According to an embodiment of the present invention, the detector may include a plurality of single-photon avalanche photodiodes (SPADs), and each of the SPAD may respond to an incident photon. A signal outputted by the SPAD is a digital signal, and correspondingly, the analog front-end component 122 may include a time-to-digital converter (TDC). In the present invention, the detector may alternatively include another type of photodiode or detector (such as SiPM), as long as the analog front-end component corresponds to a specific detector, to read and amplify a signal outputted by the detector.

The processing unit 130 is coupled to the receiving unit 120 and optionally coupled to the emitting unit 110, and is configured to receive the electrical signal to calculate a distance and/or reflectivity of the target object. The processing unit 130 can calculate the distance of the target object based on time of flight (TOF) of a detection pulse, and can calculate the reflectivity of the target object based on the intensity of an echo. Details are not repeated herein. The processing unit 130 includes one or more processing units (generally a processor). The processor is, for example, a processor comprising hardware, a central processing unit (CPU), a digital signal processor (DSP), a controller, a state machine, one or more application specific integrated circuits (ASICs), one or more radio-frequency integrated circuits (RFICs), or any combination of these.

Figure 2:
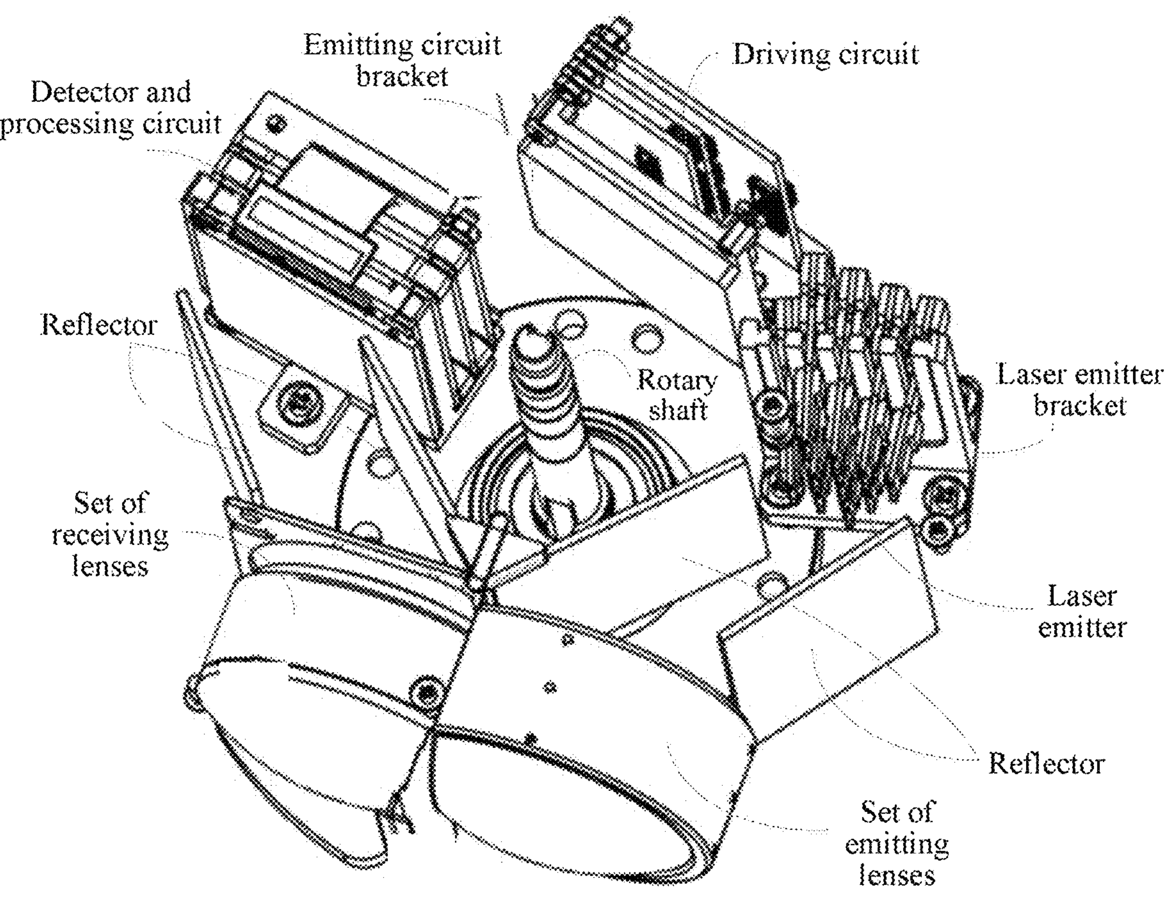
FIG. 2 shows arrangement of a laser emitter and a driving circuit in an existing lidar.

FIG. 2 shows an arrangement method of a laser emitter and a driving circuit in an existing lidar as the inventor of this application considers. As shown in FIG. 2, a plurality of laser emitters (and circuit boards) are arranged on a laser emitter bracket, and the driving circuit is arranged on an emitting circuit bracket. The laser emitter bracket and the emitting circuit bracket are separated from each other, and the laser emitter and the driving circuit are electrically connected by a flexible flat cable to drive the laser emitter to emit light. In the arrangement method of FIG. 2, a laser emitter at an emitting unit and a driving circuit of the laser emitter are arranged on different circuit boards, between which a wire is long, resulting in a high signal loss. A similar problem also exists in a detector at a receiving unit and an analog front-end circuit required for the detector.

As shown in FIG. 3A and FIG. 3B, the laser emitter 111 and the driving circuit 112 are arranged on a single PCB circuit board, and the detector 121 and the analog front-end component 122 are arranged on a single PCB circuit board. Compared with the existing technical solution only in FIG. 2, it can be seen that the solution of this application greatly avoids the problem of a long wire. For a lidar with a high performance requirement, even a weak improvement on SNR can have an effect on overall detection of the lidar, not to mention such a high improvement. In addition, by reducing the length of the wire, electrical crosstalk of the lidar can be optimized or reduced, which improves the accuracy of ranging a target object.

Moreover, a chip is used, which can also reduce plugs and sockets required in a board-level circuit of the existing lidar, and will be more convenient for assembly.

FIG. 3A shows an emitting unit 110 according to an embodiment of the present invention, in which a driving circuit 112 and a laser emitter 111 are integrated on a single PCB circuit board. As shown in FIG. 3A, the driving circuit 112 is integrated in a chip, and a plurality of laser emitters 111 and driving circuits 112 corresponding thereto are arranged on a single PCB circuit board. According to an embodiment of the present invention, the driving circuit 112 and the laser emitter 111 may be in a one-to-one correspondence. Alternatively, the driving circuit 112 and the laser emitter 111 may be in a one-to-multiple correspondence. For example, as shown in FIG. 3A, the driving circuit 112 may be a multi-channel chip, for example, may connect and drive four laser emitters 111. For a 32-line lidar, a chip with four driving circuits 112 may be used. In addition, preferably, a GaN switch and a capacitor required for operation of the laser emitter 111 may also be arranged on a single PCB circuit board. The GaN switch is preferably a dual-channel GaN switch, that is, one GaN switch is correspondingly connected to two laser emitters. Certainly, a single-channel GaN switch may alternatively be used. All these are within the protection scope of the present invention. In addition, the PCB circuit board provided with the laser emitter 111 and the driving circuit 112 is preferably connected to an upper circuit board of the lidar by a flexible flat cable.

Moreover, in an embodiment of the present invention, all laser emitters of the lidar and driving circuits corresponding thereto may be arranged on a PCB circuit board. Alternatively, for a high-line lidar, for example, a 64-line or 128-line lidar, all laser emitters and driving circuits may be arranged on a PCB circuit board. In addition, considering simpler assembly, requirements for resistance, and performance index of vertical resolution of a lidar, the laser emitters may alternatively be arranged on a plurality of circuit boards, but it is necessary to ensure that each laser emitter and a driving circuit corresponding to each laser emitter are arranged on a single PCB board, so as to avoid the problem of long wire. Certainly, for the high-line lidar, as a package size of the laser emitter continuously decreases, it is also feasible to arrange the laser emitter and the driving circuit on the same circuit board, which also falls within the protection scope of the present invention.

A chip of the driving circuit 112 may be configured according to requirements for operation of the lidar. Using a 16-line lidar as an example, when a rotation speed of the lidar is 10 HZ, 16-line laser emitters are driven to emit light in every 0.1° interval. Rapid charging and discharging are required in a process of driving the laser emitter, and there are many parasitic capacitors in a board-level circuit in the related art which affect the operation and speed of the circuit. These technical problems can be effectively overcome or reduced through the solution of the present solution.

FIG. 3B shows a detection unit 120 according to an embodiment of the present invention, in which a detector 121 and an analog front-end component 122 are integrated on a single PCB circuit board. As shown in FIG. 3B, the analog front-end component 122 is integrated in a chip, and a plurality of detectors 121 and analog front-end components 122 corresponding thereto are arranged on a single PCB circuit board. Preferably, the analog front-end component 122 is a multi-channel chip, for example, as shown in FIG. 3B, it may be a 16-channel chip, and each chip may be connected to 16 detectors 121 to read and amplify electrical signals outputted by the detectors 121. For a 32-line lidar, it is sufficient to arrange two chips of the analog front-end component 122. The detector 121 may be an avalanche photodiode, a SiPM, or SPADs. As shown in FIG. 3B, the analog front-end component is preferably connected to an upper circuit board of the lidar by a flexible flat cable.

In addition, in an embodiment of the present invention, all detectors 121 of the lidar and analog front-end components 122 corresponding thereto may be arranged on a PCB circuit board. Alternatively, the detectors may be arranged on a plurality of circuit boards, but it is necessary to ensure that each detector and an analog front-end component 122 corresponding to each detector are arranged on a single PCB board, so as to avoid the problem of long wire. Details are not repeated herein.

After detection laser beams emitted by the lidar are reflected diffusely by a target object, some echoes return to the lidar, and are received by a detector of the lidar, and converted into electrical signals. When a distance between the target object and the lidar exceeds a certain distance range (for example, ≥5 meters), an emitting field of view and a receiving field of view at least partially coincide, so an echo reflected by the target object can be focused on the detector by a set of receiving lenses of the lidar, and then information of the obstacle can be generated on a point cloud map of the lidar. When the target object is close to the lidar (for example, within 5 meters), in this case, the emitting field of view and the receiving field of view do not coincide at all, so from a perspective of the lidar, no information of the target object can be presented in the point cloud map, or in other words, the lidar cannot detect the target object. As for possible factors for generating a short-range blind region, reference may be made to a relevant description of FIG. 1A and FIG. 1B, and details are not repeated herein. For the existing lidar with a non-coaxial optical system, there is usually a certain detection blind region, a target object in the detection blind region cannot be detected by the lidar, and a range of the detection blind region is also an important index to range performance of a lidar.

The inventor of the present application conceived that a compensation unit for a blind region may be added at an emitting unit of the lidar to greatly reduce a blind region of the lidar. Specifically, the compensation unit for a blind region may be arranged downstream of an optical path of a laser emitter. After processed by the compensation unit for a blind region, a detection beam emitted by the laser emitter can be received by a target object in a short range, and an echo reflected by the target object in the short range can be received by a detector, and then processed by a signal processing unit. Finally, information of the obstacle is presented in a point cloud map obtained by lidar scanning. In other words, the compensation unit for a blind region can deflect a part of emitted light to a receiving field of view of the detector at a specific angle, so a beam emitted by the compensation unit for a blind region begins to overlap with the receiving field of view of the detector in a region close to the lidar, thereby reducing a range of the short-range blind region. According to this application, by using the compensation unit for a blind region, a blind region range of the lidar is greatly reduced and even completely eliminated, and performance of the lidar is greatly improved. To facilitate a better understanding and implementation of this application by those skilled in the art, various embodiments of the compensation unit for a blind region are described in detail below with reference to specific FIG. 4A to FIG. 4E. In a specific implementation, a short range may be 0-3 m, 0.1-2 m, or 0.3-2.5 m. When actually implementing this application, those skilled in the art may adaptively adjust the short range according to a detection distance requirement of the lidar, a size of the lidar, a parameter of a lens set of the lidar, and other information. A relationship between a deflection angle of the compensation unit for a blind region and reduction of a range of the short-range blind region is shown with reference to FIG. 4F. In FIG. 4F, a beam deflection angle is θ(θ is an included angle between a beam deflected by the compensation unit for a blind region and a received beam), a distance between a position where a blind compensation beam deflected by the compensation unit for a blind region emits from the lidar and a center of a receiving lens is d, a diameter of the receiving lens is D, and a farthest distance and a shortest distance between a region of short-range signal enhancement and a vertex of the receiving lens are respectively L and L'. As shown in FIG. 4F, the above parameters meet the following relationships:

$$\frac{d + D/2}{L} = \tan\theta$$

$$L' = L - D/\tan\theta$$

Therefore, through the foregoing relationships, parameters such as a mounting position and a deflection angle of the compensation unit for a blind region are determined according to the shortest distance L' that needs to be enhanced.

Figure 4A:
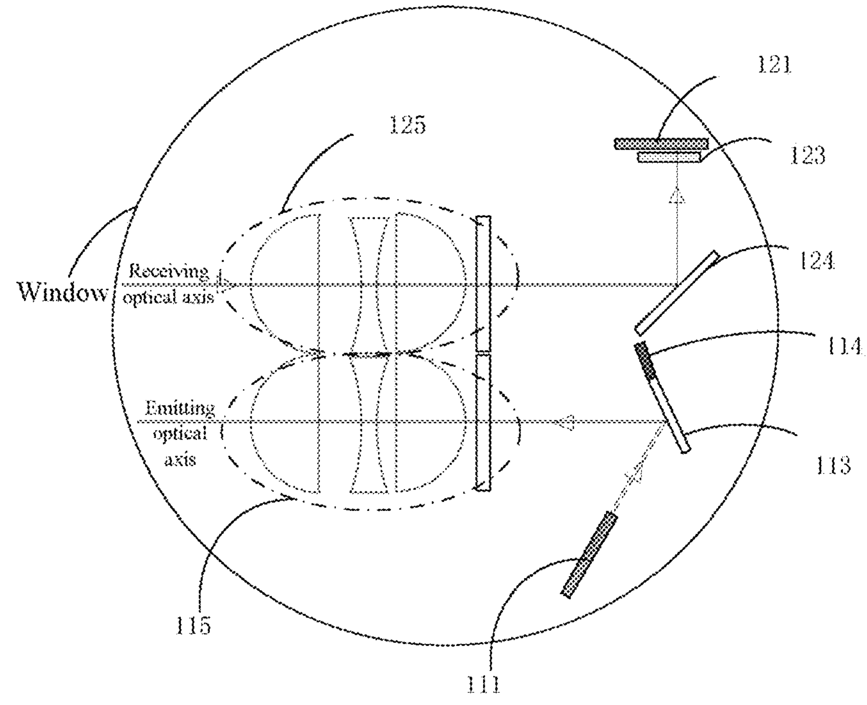
FIG. 4A is a top view of a lidar according to an embodiment of the present invention.
Figure 4B:
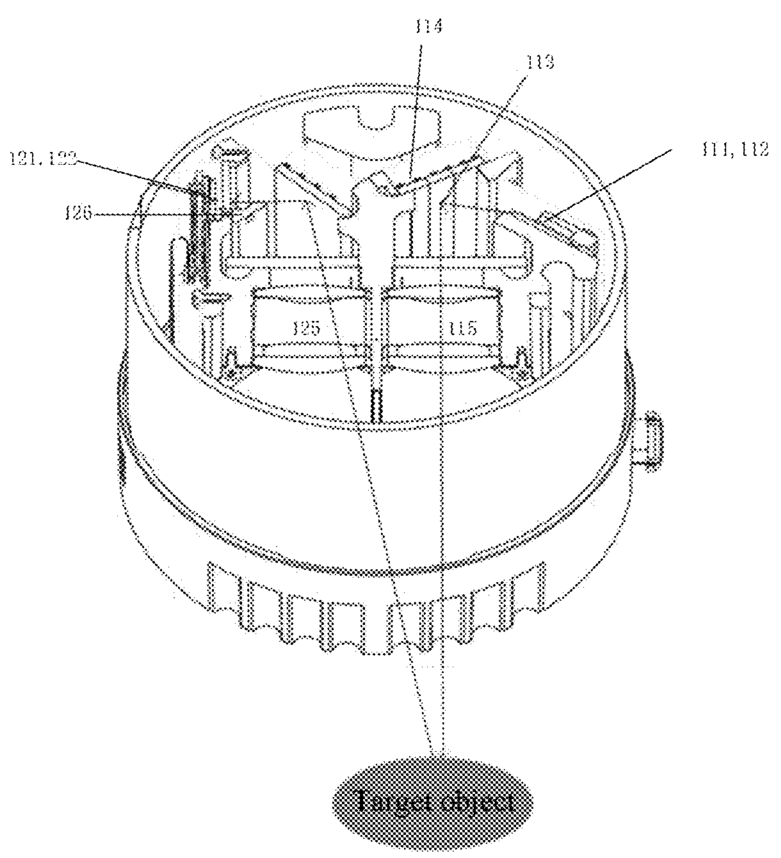
FIG. 4B shows an internal structure of the lidar according to the embodiment of FIG. 4A.
Figure 4C:
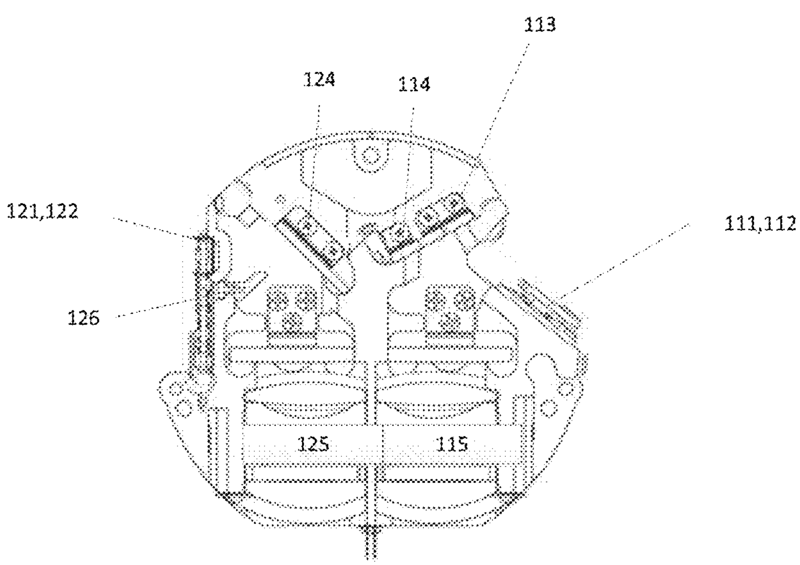
FIG. 4C is a top view of the lidar according to the embodiment of FIG. 4A.

FIG. 4A is a top view of a lidar 100 according to an embodiment of the present invention. As shown in FIG. 4A, an emitting unit 110 of the lidar 100 includes a laser emitter 111, a first reflector 113 (also referred to as a first reflecting portion), and a set of emitting lenses 115. The laser emitter 111 emits detection laser beams, and the detection laser beam is incident on the first reflector 113, reflected toward the set of emitting lenses 115, modulated (such as collimated) by the set of emitting lenses 115, passes through a window of the lidar 100, and emitted into a surrounding environment. The emitting unit 110 further includes a second reflector 114 (second reflecting portion) serving as a compensation unit for a blind region. The first reflector 113 and the second reflector 114 are arranged in an opposite and non-parallel manner, that is, the first reflector 113 and the second reflector form an included angle which is not equal to zero. The second reflector 114 deflects the detection laser beam toward a direction of a receiving optical axis of a receiving unit by a greater degree than the first reflector 113, so that at least part of a target object in a blind region can receive the detection laser beam and a reflected echo can be received by a detector.

In FIG. 4A, during the operation of the lidar, the detection laser beam emitted from the laser emitter 111 is a divergent light with a relatively large divergence angle instead of a strictly collimated light, so some lights reach the second reflector 114. These lights can irradiate a close target object, although the intensity of these lights is relatively low, due to a small distance from the target object, the echo intensity is enough for the echo to be received by the detector, and thus an electrical signal outputted by the detector can be subjected to subsequent signal processing and calculation.

The first reflector 113 and the second reflector 114 may be arranged adjacent to each other, and are arranged non-parallel downstream of an optical path of the laser emitter 111 to receive detection laser beams emitted from the laser emitter 111. The set of emitting lenses 115 is arranged downstream of optical paths of the first reflector 113 and the second reflector 114. The detection laser beam is directly incident on the set of emitting lenses 115 after reflected by the first reflector and the second reflector, and emitted after modulated by the set of emitting lenses 115. According to an embodiment of the present invention, both the first reflector 113 and the second reflector 114 may be integrally formed, that is, may be different parts (at an angle to each other) of the same reflector. Alternatively, both the first reflector 113 and the second reflector 114 may be separate reflectors, for example, fixed on a reflector bracket through a glue or mechanical fixing member. Specific fabrication and mounting methods of the first reflector 113 and the second reflector 114 are not limited in this application.

The first reflector 113 may be used as a primary reflector (mainly for detecting other obstacles in a non-blind region), and the second reflector 114 may be used for compensation of a blind region, preferably at an angle greater than 180° and less than 360°, preferably 190°, with a reflective surface of the first reflector 113, to enhance a short-range blind compensation function. It can be understood that an included angle between reflective surfaces of the first reflector 113 and the second reflector 114 is associated with a size of a opto-mechanical rotor of the whole lidar, and setting of the included angle not only requires blind compensation, but also needs to pay attention to that a beam reflected by a reflector for compensating a blind region may be deflected and emitted out of the lidar. In addition, because the detection laser beam is directly incident on the set of emitting lenses 115 after reflected by the first reflector and the second reflector, this optical path design with one reflection can make full use of the space of the lidar and enlarge a focal length of the lidar in a limited space. In this embodiment, a width of the first reflector 113 may be greater than that of the second reflector 114, and the second reflector may reflect a part of light of a light source to a target object closer to the lidar, thereby achieving a blind compensation effect.

Figure 4D:
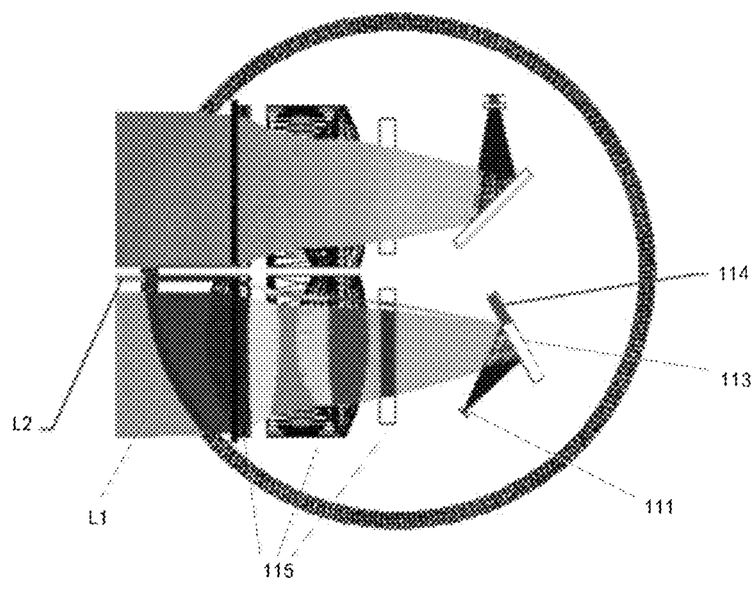
FIG. 4D is a schematic diagram of an optical path of the lidar according to the embodiment of FIG. 4A.
Figure 4E:
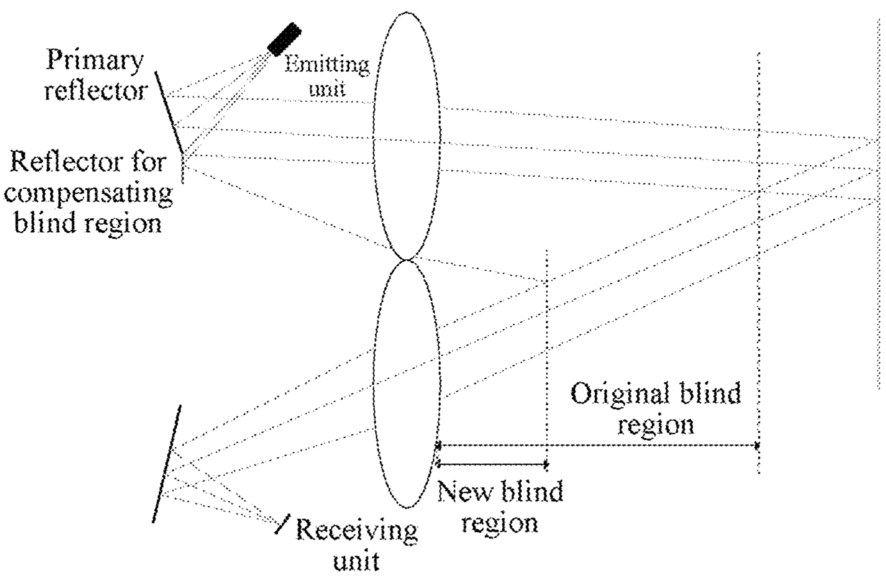
FIG. 4E is a schematic diagram of a comparison between a blind region of the lidar according to the embodiment of FIG. 4A and a blind region of an existing lidar.
Figure 4F:
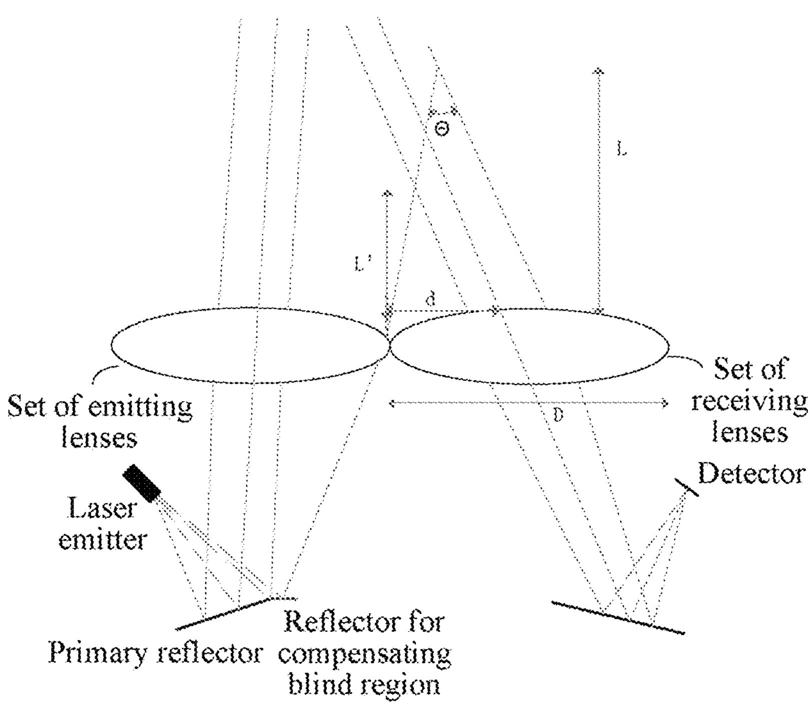
FIG. 4F is a schematic diagram of a relationship between various parameters of an optical path of the lidar according to the embodiment of FIG. 4A.

In order to facilitate an effect after the compensation unit for a blind region is added, FIG. 4D is a schematic diagram of an optical path of the lidar after the second reflector 114 is added, and FIG. 4E is a schematic diagram of blind region improvement of the lidar after the second reflector 114 is added. Referring to FIG. 4D and FIG. 4E, most of laser emitted from the laser emitter 111 is incident on the first reflector 113, reflected by the first reflector 113, and then emitted to the outside of the lidar through the set of emitting lenses 115 to form detection laser beams L1. A small part of laser emitted from the laser emitter 111 (for example, a part of light with a large divergence angle on the edge) is incident on the first reflector 114, reflected by the first reflector 114, and then emitted to the outside of the lidar through the set of emitting lenses 115 to form a blind compensation laser beam L2. The blind compensation laser beam L2 is closer to a receiving optical axis of a set of receiving lenses 125 than the detection laser beam L1 (see FIG. 4A). It can be understood that, a function of the compensation unit for a blind region is to separate a part of an emitted laser beam from an emitted beam, change its direction (which may also include changing a divergence angle of the emitted beam), and make it start to overlap with a receiving field of view of a detector from a position close to the lidar. In this way, the detector can receive a signal light reflected by a short-range target to reduce a short-range blind region of the lidar. Referring to FIG. 4E, it can be seen that a blind region is greatly reduced after the reflector for compensating a blind region is used, and can even be reduced to 0.

Still referring to FIG. 4A, the receiving unit 120 may further include a set of receiving lenses 125, and a filter 123 and a reflector 124 arranged upstream of an optical path of the detector 121. The detector 121 is arranged on a focal plane of the set of receiving lenses 125. The reflector 124 and the filter 123 are sequentially arranged between the set of receiving lenses 125 and the detector 121. An echo from a target object is focused through the set of receiving lenses 125, and then a direction of the echo is changed through the reflector 124. The echo is incident on the detector 121 through the filter 123, and converted into an electrical signal through the detector 121. The filter 123 is arranged on a surface of the detector 121, for filtering a detection echo incident to the detector. An echo in a predetermined wavelength range is selected to be incident to the detector, so that an influence of an ambient light can be reduced. In addition, in view of a blue shift of wavelengths of beams at different incident angles, a bandwidth of the filter can be appropriately increased on the premise of balancing a signal-to-noise ratio.

FIG. 4B shows an internal structure of the lidar according to the embodiment of FIG. 4A, and FIG. 4C is a top view of the lidar. As shown in FIG. 4B and FIG. 4C, the emitting unit 110 includes two reflectors, which are respectively a first reflector 113 and a second reflector 114, and these two reflectors are arranged non-parallel. In addition, a width of the first reflector 113 is greater than that of the second reflector 114. The first reflector 113 is used for normal lidar detection, and the second reflector 114 is used for short-range blind compensation, that is, a part of detection laser beams emitted from a light source 111 is reflected on an obstacle closer to the lidar, thereby achieving a blind compensation effect.

Moreover, according to an embodiment of the present invention, as shown in FIG. 4C, a receiving unit 120 of the lidar further includes a light shielding plate 126. The light shielding plate 126 is located between the reflector 124 and the detector 121, and configured to block part of echo reflected from the reflector 124, which can reduce ghost lines in a lidar point cloud.

Figure 5:
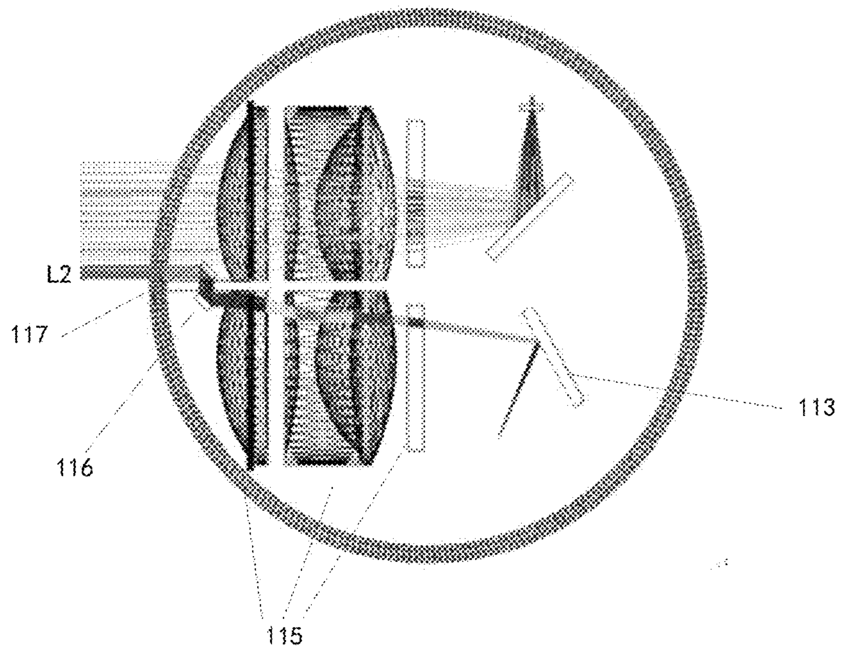
FIG. 5 shows a compensation unit for a blind region according to another embodiment of the present invention.

FIG. 5 shows a compensation unit for a blind region according to another embodiment of the present invention. As shown in FIG. 5, the compensation unit for a blind region includes a first reflector for compensating a blind region 116 and a second reflector for compensating a blind region 117 arranged outside a set of emitting lenses 115. The first reflector for compensating a blind region 116 and the second reflector for compensating a blind region 117 may be arranged in parallel or non-parallel, as long as a detection beam reflected by the first reflector for compensating a blind region 116 and the second reflector for compensating a blind region 117 can be closer to a receiving optical axis than a non-reflected beam, so that obstacles within a predetermined threshold range (such as ≤5 m) can receive the detection beam, echoes reflected by these obstacles can be received by a detector, and information of these obstacles can finally appear in a point cloud of the lidar. The first reflector for compensating a blind region 116 receives detection laser beams emitted from the set of emitting lenses 115, and reflects the detection laser beam toward the second reflector for compensating a blind region 117. The second reflector for compensating a blind region reflects the detection laser beam and emits it outside, to form a blind compensation laser beam L2. The blind compensation laser beam L2 is closer to an optical axis of a set of receiving lenses 125 than the detection laser beam emitted from the set of emitting lenses, thereby enhancing a blind compensation effect.

FIG. 4A to FIG. 4D, and FIG. 5 respectively show two embodiments of the compensation unit for a blind region. It is readily conceivable by those skilled in the art that the two embodiments may be combined to further deflect the detection laser beam toward the receiving optical axis direction of the set of receiving lenses 125, to further enhance the blind compensation effect.

Figure 6:
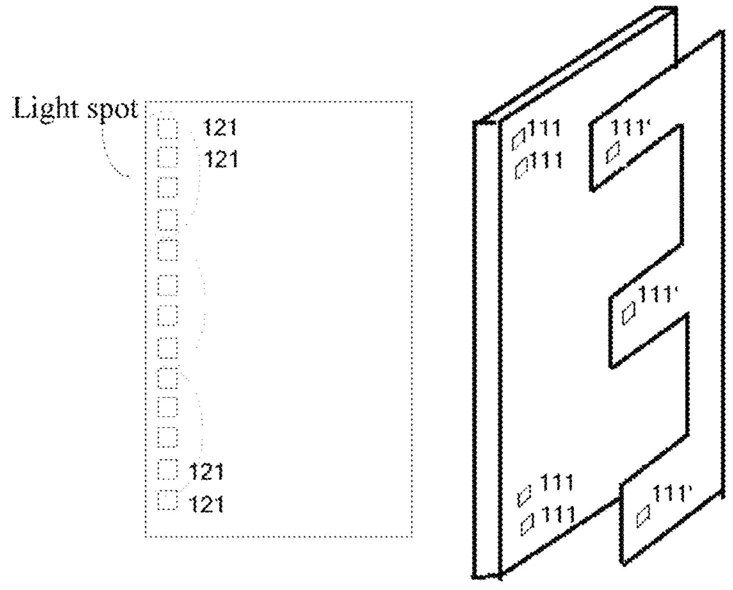
FIG. 6 shows a light source for compensating a blind region according to an embodiment of the present invention.

In addition, as shown in FIG. 6, according to an embodiment of the present invention, in order to enhance the blind compensation effect, a compensation unit for a blind region may include light sources for compensating a blind region (such as 3-8 light sources for compensating a blind region, the specific number is selected as required, and 3 light sources for compensating a blind region are used as an example in this application), and the light sources for compensating a blind region are arranged at positions deviating from a focal plane of a set of emitting lenses.

As shown in FIG. 6, a laser emitter 111 and a detector 121 are usually in a one-to-one correspondence. The laser emitter 111 is arranged on a focal plane of a set of emitting lenses 115, so that a laser beam emitted by the laser emitter 111 can be emitted from a lidar as a parallel light after reflected and collimated, and when the laser beam irradiates a target object at a maximum detection distance (for example, 200 m) and an echo returns to the lidar, the echo is received by the detector 121 corresponding to the laser emitter 111. A blind region usually exists in a region close to the lidar. In order to reduce the blind region, in this embodiment, light sources for compensating a blind region 111' are added and arranged at a position deviating from the focal plane of the set of emitting lenses 115. Therefore, after a laser emitted from the light source for compensating a blind region 111' is reflected by the target object, a light spot formed by the echo on a photodetector is relatively large (as circled by dotted lines shown in FIG. 6), and can cover a plurality of detectors 121 (FIG. 6 shows that four detectors 121 are covered). When a target object is relatively far, light energy on the detector 121 is very low, which may not be sensed by the detector 121, or will be filtered out as noise. Only when an echo reflected by a target object in a short distance is sufficient to be received by the photodetector, so the blind compensation can be achieved in a short distance.

Preferably, the laser emitter includes an edge-emitting laser emitter, and the detector includes an avalanche photodiode (APD). A plurality of edge-emitting laser emitters preferably do not emit light at the same time, but emit light in a certain sequence, which can reduce crosstalk between various detection channels and improve a signal-to-noise ratio. A detection laser pulse emitted by the laser emitter may be coded by using double pulses, for example, may be coded by using time intervals and/or amplitudes of the double pulses, to reduce crosstalk. A light emitting intensity of the laser emitter may be determined, that is, the laser emitter emits light at the same power every time of detection. Alternatively, the light emitting intensity of the laser emitter may be dynamically adjusted, for example, according to an ambient light intensity of the lidar. For example, when the ambient light intensity of the lidar is higher than a threshold, the light emitting intensity or power of the laser emitter is increased. When the ambient light intensity is lower than the threshold, the light emitting intensity or power of the laser emitter is reduced. In addition, the light emitting intensity of the laser emitter may be adjusted according to the reflectivity of a target object detected in a previous channel. For example, when the reflectivity of the target object is high, the light emitting intensity or power of the laser emitter may be appropriately reduced. When the reflectivity of the target object is low, the light emitting intensity or power of the laser emitter may be appropriately increased.

Figure 7:
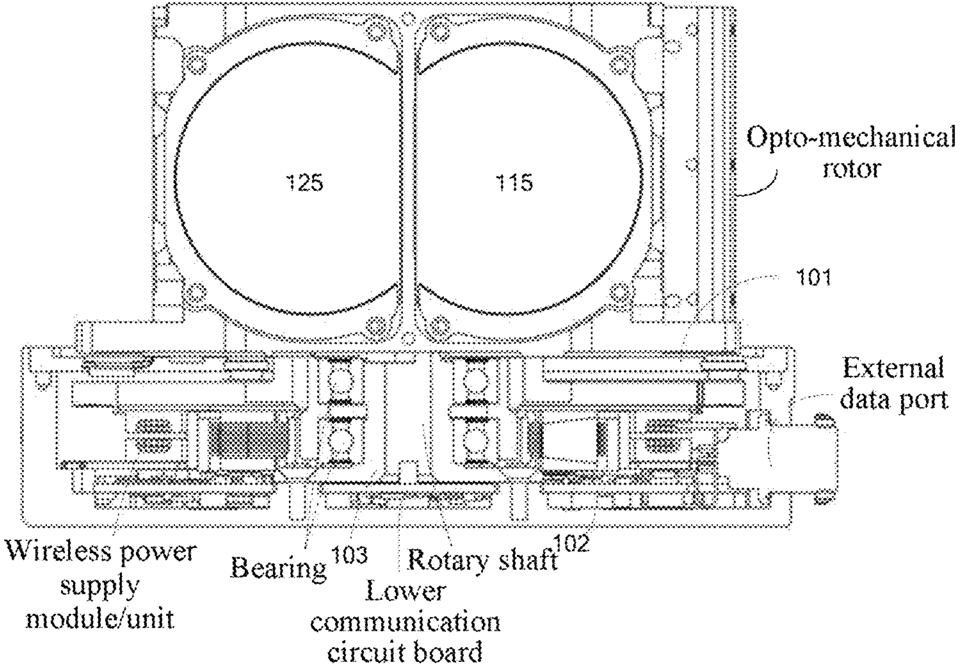
FIG. 7 shows a lidar according to an embodiment of the present invention.

FIG. 7 shows a lidar according to an embodiment of the present invention. As shown in FIG. 7, the lidar further includes an upper circuit board 101, a lower circuit board 102, and a rotary shaft 103. The rotary shaft 103 is located between the upper circuit board 101 and the lower circuit board 102. An opto-mechanical rotor having the emitting unit 110 and the receiving unit 120 is fixed on the upper circuit board, and is driven by a motor to rotate around the rotary shaft. In the embodiment of FIG. 7, the opto-mechanical rotor and the upper circuit board 101 are fixed together, and are jointly driven by the rotary shaft 103 to rotate. A frequency of rotation is, for example, 10 Hz or 20 Hz. One detection is performed every predetermined angle (for example, 0.1 degrees or 0.2 degrees) during a rotation process. The laser emitter of the emitting unit 110 performs emission in a certain sequence to complete a cycle of emission, and the receiving unit 120 receives an echo and performs corresponding signal processing to complete detection.

In addition, in the embodiment of FIG. 7, the rotary shaft 103 does not penetrate through the entire lidar, but only occupies a small part of the lidar in height, so that all space above the upper circuit board can be used for the opto-mechanical rotor of the lidar, which is helpful for arrangement and utilization of the space. Moreover, due to use of a non-penetrating shaft, the rotary shaft and a bearing are enlarged, which can enhance the service life and reliability of the shaft system. To drive the rotary shaft, the lidar may further include a motor (not shown), and the motor may be arranged on the lower circuit board 102. A terminal of the motor may be first integrated into a flexible flat cable to avoid welding.

Figure 8:
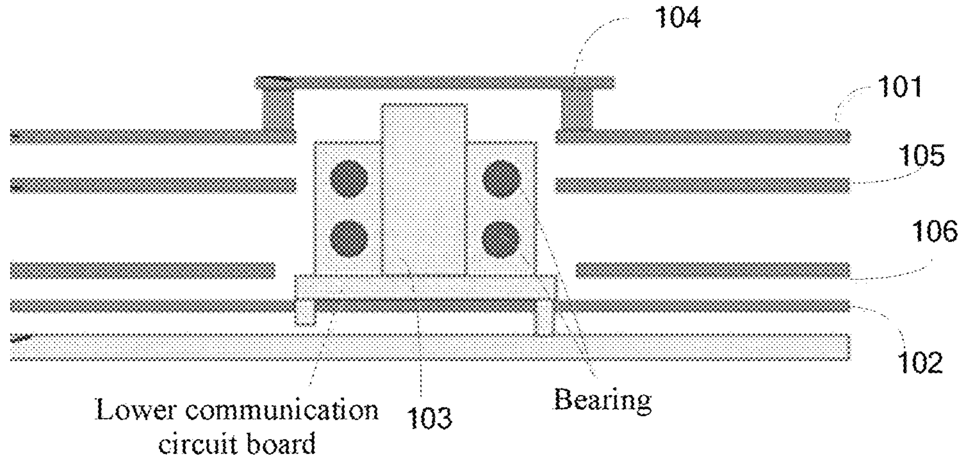
FIG. 8 is a schematic diagram of an upper circuit board and a lower circuit board.
Figure 9:
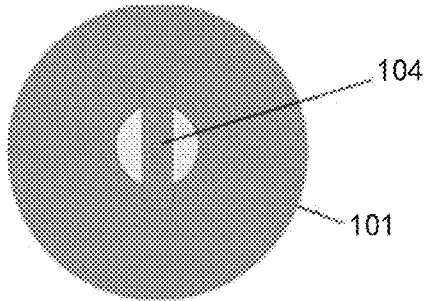
FIG. 9 is a top view of an upper circuit board.

FIG. 8 is a schematic diagram of an upper circuit board 101 and a lower circuit board 102, and FIG. 9 is a top view of the upper circuit board 101. As shown in FIG. 8, a lidar 100 further includes an upper communication circuit board 104 and a lower communication circuit board 102. The lower communication circuit board is integrated with the lower circuit board 102. A two-way wireless communication link can be established between the upper communication circuit board 104 and the lower communication circuit board. The two-way communication link is used as an example for description. A detection signal formed by detecting a target object by an opto-mechanical rotor of the lidar can be transmitted from the upper communication circuit board 104 to the lower communication circuit board through a downlink communication link, and then transmitted to the lower circuit board. After an operation of the lower circuit board such as adding a coordinate system, a point cloud of the lidar is generated. If it is necessary to control some laser emitters to emit light or adjust light emitting intensity of some laser emitters or activate some detectors, a corresponding control signal to be sent to the opto-mechanical rotor may be transmitted from the lower communication circuit board to the upper communication circuit board 104 through an uplink communication link. The upper communication circuit board is arranged over the rotary shaft, for example, the upper communication circuit board is supported above the upper circuit board through a plurality of supporting plates, so that the upper communication circuit board is spaced apart from the rotary shaft by a certain distance. The upper communication circuit board 104 is also coupled to the upper circuit board 101. In addition, as shown in FIG. 9, the upper communication circuit board 104 is, for example, in a long-strip shape.

Figure 10:
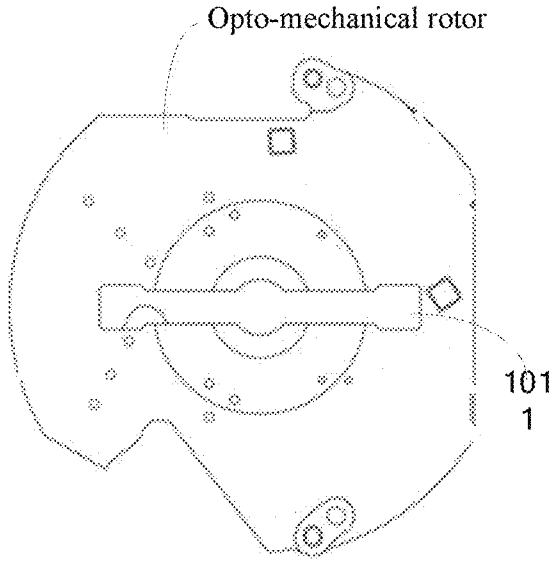
FIG. 10 is a bottom view of an opto-mechanical rotor.
Figure 11:
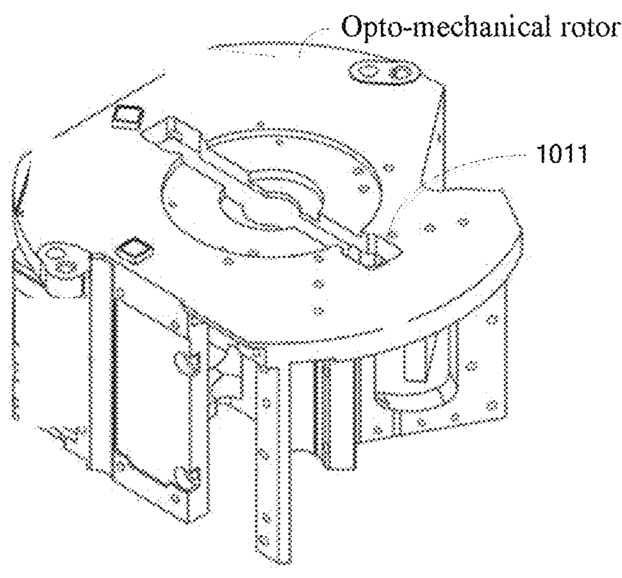
FIG. 11 is a three-dimensional view of an opto-mechanical rotor.

FIG. 10 is a bottom view of the opto-mechanical rotor, and FIG. 11 is a perspective view of the opto-mechanical rotor that is turned over. As shown in FIG. 10 and FIG. 11, a cavity 1011 corresponding to the upper communication circuit board 104 is provided on a bottom of the opto-mechanical rotor, and is configured to accommodate the upper communication circuit board 104. In this way, the upper communication circuit board 104 is embedded in the opto-mechanical rotor, so that the upper communication circuit board 104 substantially does not increase an overall height of the lidar, which helps to keep the height of the lidar within a small level, so as to meet requirements of various customers.

When the detector includes an avalanche photodiode (APD), the receiving unit may further include an amplifying circuit and an analog-to-digital converter (ADC). The amplifying circuit is coupled to the APD to amplify the electrical signal, and the ADC is coupled to the amplifying circuit to perform analog-to-digital conversion on the amplified electrical signal. Additionally or alternatively, the detector includes a SiPM or a single photon avalanche photodiode (SPAD), the receiving unit further includes a time-to-digital converter, and the time-to-digital converter is coupled to the detector.

Figure 12:
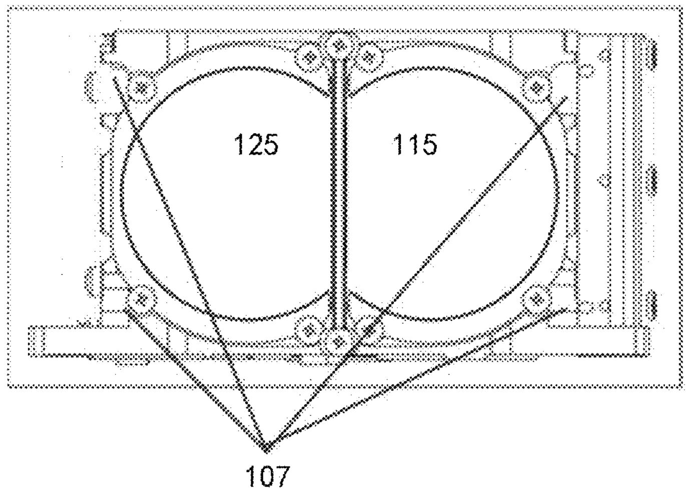
FIG. 12, FIG. 12A, and FIG. 13 are schematic diagrams in which a set of emitting lenses and a set of receiving lenses are fixed to a lidar through an elastic piece assembly.
Figure 12A:
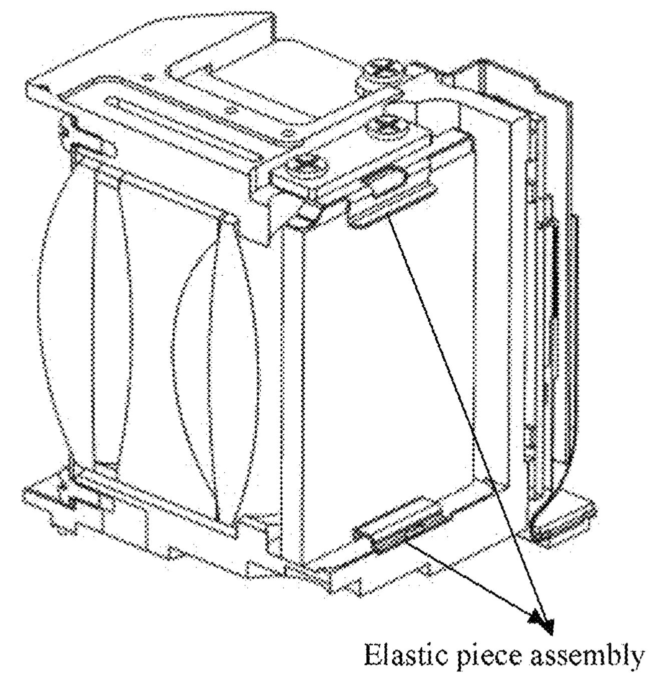
Figure 13:
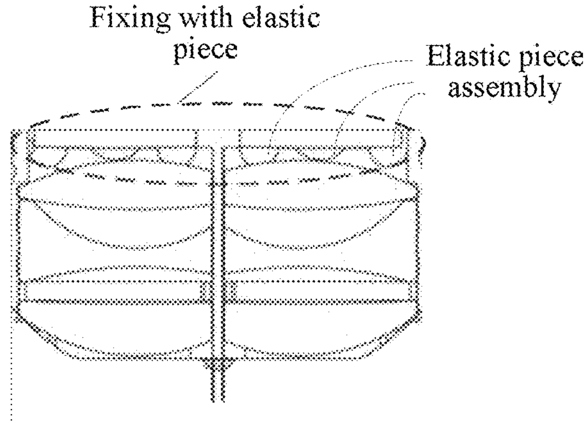

In the existing lidar, the set of emitting lenses and the set of receiving lenses are usually fixed by using a glue. An operating process of fixing by using the glue is complex, involving, for example, selection of the glue, curing temperature of the glue, curing time, stress caused by curing, and temperature resistance after curing. According to an embodiment of the present invention, instead of fixing the set of emitting lenses and the set of receiving lenses by using a glue, the set of emitting lenses and the set of receiving lenses may be fixed to the lidar through an elastic piece assembly and an opto-mechanical rotor. As shown in FIG. 12, FIG. 12A, and FIG. 13, a set of emitting lenses 115 and a set of receiving lenses 125 are preferably fixed to a lidar through an elastic piece assembly 107, thereby achieving a more reliable connection. The elastic piece assembly 107 may be arranged on a frame or a housing of the lidar, and the set of emitting lenses 115 and the set of receiving lenses 125 are pressed through an elastic force of the elastic piece assembly 107 or using a screw fastener. Reliability of the lidar can be greatly improved by replacing the glue with the elastic piece assembly.

Figure 14:
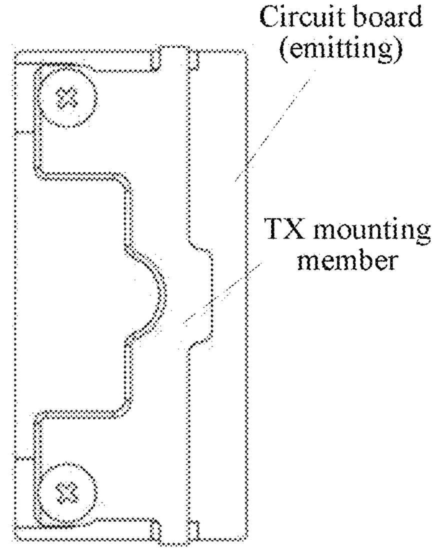
FIG. 14 is a schematic diagram of mounting a PCB circuit board in which a laser emitter and a driving circuit are mounted in an emitting unit of a lidar.

FIG. 14 is a schematic diagram of a PCB circuit board in which a laser emitter and a driving circuit are mounted in an emitting unit 110 of a lidar. The PCB circuit board is fixed preferably using a pressing plate and a screw instead of a glue.

FIG. 15A and FIG. 15B are schematic diagrams of mounting a PCB circuit board in which a detector 121 and an analog front-end circuit 122 are mounted in a receiving unit 120 of a lidar. The PCB circuit board is mounted preferably using a screw. FIG. 15A shows the circuit board of the receiving unit 120. As shown in the figure, for example, there are four through holes thereon. The receiving unit 120 further includes a mounting member (as shown in FIG. 15B). There are also through holes on the mounting member at positions, for example, corresponding to the through holes on the PCB circuit board. The screw passes through the through hole on the mounting member and the through hole on the circuit board, to fix the circuit board. In addition, when the circuit board is assembled, it is necessary to leave a certain margin in a left-right direction, up-down direction, and direction perpendicular to paper in the figure, so as to facilitate mounting. For example, sizes of the through holes on the circuit board and the through holes on the mounting member are both greater than diameters of the screws, so that the circuit board can be adjusted along the left-right direction and the up-down direction in the figure, that is, to adjust a position of the detector 121. This is extremely advantageous in lidar calibration, because it is often necessary to make small adjustments to the position of the detector 121, until it can receive an echo generated by detection laser beams emitted by a corresponding laser emitter. In a direction perpendicular to paper in FIG. 15A and FIG. 15B, positioning may be performed by mounting a gasket on a bottom of the PCB circuit board.

FIG. 16A and FIG. 16B show electrical connection structures of a circuit board of an emitting unit and a circuit board of a receiving unit. As shown in FIG. 16A, the emitting unit includes a connecting cable. One end of the connecting cable is connected to the circuit board of the emitting unit, and the other end of the connecting cable includes a connector, which can be connected to the upper circuit board 101 of a lidar (as shown in FIG. 7 and FIG. 8). Similarly, as shown in FIG. 16B, the receiving unit includes a connecting cable. One end of the connecting cable is connected to the circuit board of the receiving unit, and the other end of the connecting cable includes a connector, which can be connected to the upper circuit board 101 of a lidar (as shown in FIG. 7 and FIG. 8). Preferably, the connecting cables of the receiving unit are all rigid flat cables or flexible flat cables, avoiding a combination of the rigid flat cables and the flexible flat cables. The combined board wires are very expensive, so avoiding the use of the combined board wires can reduce a lot of costs.

Figure 17:
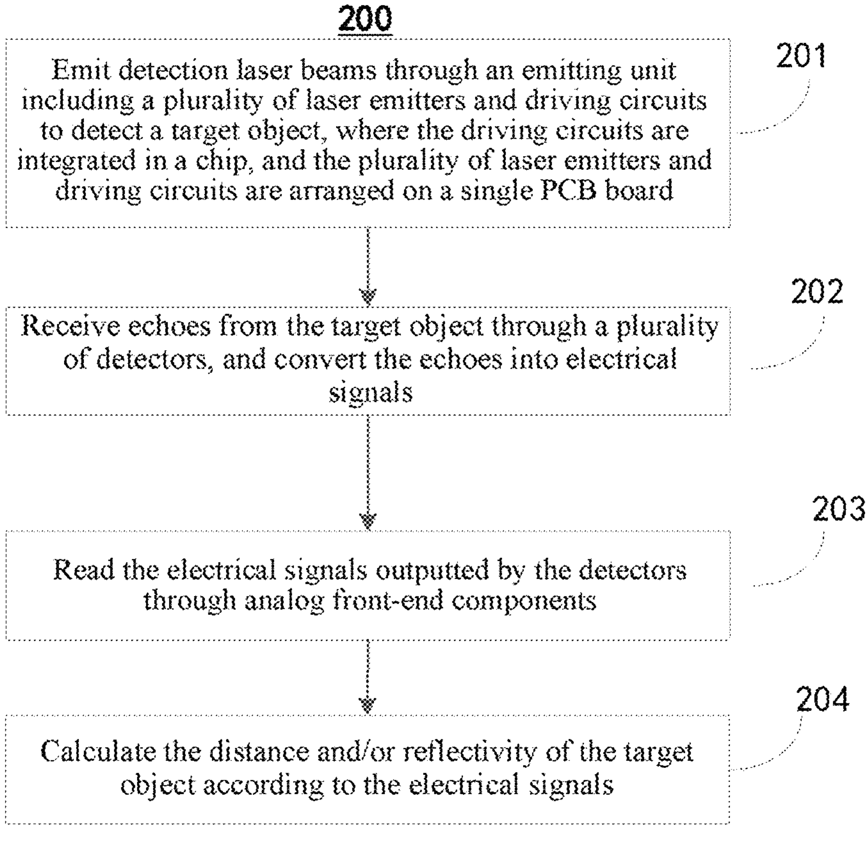
FIG. 17 shows a ranging method according to an embodiment of the present invention.

As shown in FIG. 17, the present invention further involves a ranging method 200. The method includes the following steps.

Step S201. Emit detection laser beams through an emitting unit including a plurality of laser emitters and driving circuits to detect a target object, where the driving circuits are integrated in a chip, and the plurality of laser emitters and driving circuits are arranged on a single PCB board.

Step S202. Receive echoes from the target object through a plurality of detectors, and convert the echoes into electrical signals.

Step S203. Read the electrical signals outputted by the detectors through analog front-end components, where the analog front-end components are integrated in the chip, and the plurality of detectors and the analog front-end components corresponding thereto are arranged on a single PCB board.

Step S204. Calculate the distance and/or reflectivity of the target object according to the electrical signals.

According to an embodiment of the present invention, the ranging method 200 using a lidar further includes the following steps.

The detection laser beams are incident on the target object within a short range through a compensation unit for a blind region arranged downstream of an optical path of the laser emitter; and the echoes from the target object within the short range are received through the detectors.

According to an embodiment of the present invention, the driving circuits are configured to drive the plurality of laser emitters to emit light sequentially; and the analog front-end components are configured to amplify electrical signals outputted by different detectors according to a detection requirement of a lidar.

For example, a driving chip of the laser emitter is a 4-channel driving chip, which correspondingly drives 4 laser emitters sequentially. A chip of each analog front-end circuit is a 16-channel chip, which is continuously switched among 16 channels, so as to read and amplify an electrical signal outputted by each detector sequentially.

Figure 18:
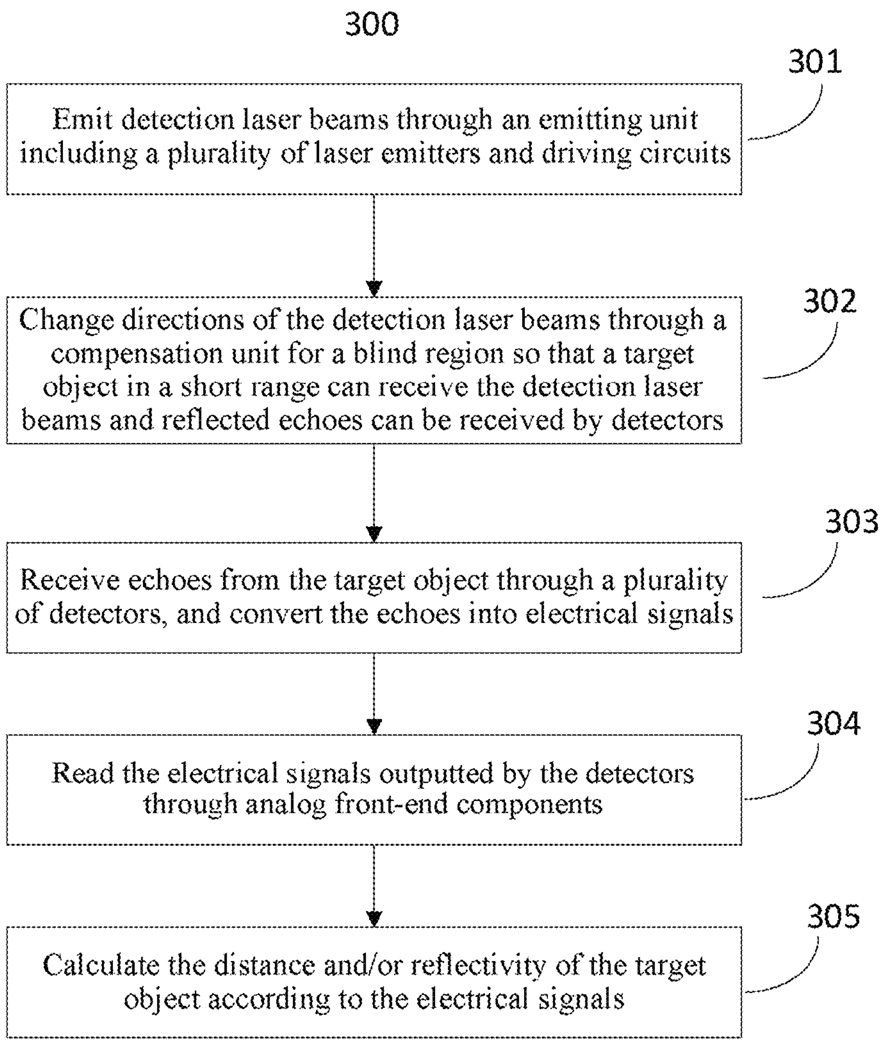
FIG. 18 shows a ranging method according to another embodiment of the present invention.

As shown in FIG. 18, the present invention further involves a ranging method 300. The method includes the following steps.

Step S301. Emit detection laser beams through an emitting unit including a plurality of laser emitters and driving circuits.

Step S302. Change directions of the detection laser beams through a compensation unit for a blind region so that a target object in a short range can receive the detection laser beams and reflected echoes can be received by detectors.

Step S303. Receive echoes from the target object through a plurality of detectors, and convert the echoes into electrical signals.

Step S304. Read the electrical signals outputted by the detectors through analog front-end components.

Step S305. Calculate the distance and/or reflectivity of the target object according to the electrical signals.

According to an embodiment of the present invention, the driving circuits are integrated in a chip, and the plurality of laser emitters and the driving circuits corresponding to the plurality of laser emitters are arranged on a single PCB board. The analog front-end components are integrated in the chip, and the plurality of detectors and the analog front-end components corresponding to the plurality of detectors are arranged on a single PCB board.

According to an embodiment of the present invention, the driving circuits are configured to drive the plurality of laser emitters to emit light sequentially; and the analog front-end components are configured to amplify electrical signals outputted by different detectors according to a detection requirement of a lidar.

Finally, it should be noted that: the foregoing descriptions are merely preferred embodiments of the present invention, but are not intended to limit the present invention. Although the present invention has been described in detail with reference to the foregoing embodiments, for a person of ordinary skill in the art, modifications can be made to the technical solutions described in the foregoing embodiments, or equivalent replacements can be made to some technical features in the technical solutions. Any modification, equivalent replacement, or improvement made within the spirit and principle of the present invention shall fall within the protection scope of the present invention.

What is claimed is:

1. A lidar, comprising:

an emitting unit, comprising a plurality of laser emitters and driving circuits, wherein the driving circuits are configured to drive the laser emitters to emit detection laser beams for detecting a target object, the emitting unit further comprises a compensation unit for a blind region, and the compensation unit for a blind region is configured to cause a target object within a short range of the lidar to receive the detection laser beams and cause reflected echoes to be received by detectors, a first reflecting portion, wherein the compensation unit comprises a second reflecting portion arranged in a non-parallel manner relative to the first reflecting portion;

a receiving unit, comprising a plurality of detectors, wherein the detectors are configured to receive echoes of the detection laser beams reflected by the target object and to convert the echoes into electrical signals; and a processing unit, coupled to the receiving unit and configured to receive the electrical signals for calculating the distance and/or reflectivity of the target object.

2. The lidar according to claim 1, wherein the driving circuits are integrated in a chip, and the plurality of laser emitters and the driving circuits corresponding to the plurality of laser emitters are arranged on a single PCB board; and wherein the receiving unit further comprises analog front-end components, the analog front-end components are coupled to the detectors and are configured to read electrical signals outputted by the detectors, the analog front-end components are integrated in the chip, and the plurality of detectors and the analog front-end components corresponding to the plurality of detectors are arranged on a single PCB board.

3. The lidar according to claim 1, wherein the second reflecting portion deflects the detection laser beams toward a direction of an optical axis of the receiving unit by a greater degree than the first reflecting portion.

4. The lidar according to claim 3, wherein the first reflecting portion and the second reflecting portion represent separate reflectors; or the first reflecting portion and the second reflecting portion represent different portions of the same reflector.

5. The lidar according to claim 1, wherein an angle between reflective surfaces of the first reflecting portion and the second reflecting portion is greater than 180° and less than 360°.

6. The lidar according to claim 1, wherein the emitting unit comprises the first reflecting portion and a set of emitting lenses, and the compensation unit for a blind region comprises a first reflector for compensating a blind region and a second reflector for compensating a blind region;

the first reflector for compensating a blind region is configured to receive detection laser beams from the set of emitting lenses and then reflect the detection laser beams to the second reflector for compensating a blind region; and the second reflector for compensating a blind region is configured to reflect the detection laser beams again to emit the detection laser beams from the lidar to the outside; and the detection laser beams emitted to the outside are closer to the optical axis of the receiving unit than the detection laser beams emitted from the set of emitting lenses.

7. The lidar according to claim 2, wherein the emitting unit further comprises a set of emitting lenses, and the compensation unit for a blind region comprises a light source for compensating a blind region;

the set of emitting lenses is arranged downstream of an optical path of the laser emitter; and the light source for compensating a blind region is arranged at a position deviating from a focal plane of the set of emitting lenses.

8. The lidar according to claim 1, further comprising an upper circuit board, a lower circuit board, and a rotary shaft located between the upper circuit board and the lower circuit board, wherein an opto-mechanical rotor having the emitting unit and the receiving unit is fixed on the upper circuit board, and is driven by a motor to rotate around the rotary shaft.

9. The lidar according to claim 8, further comprising an upper communication circuit board and a lower communication circuit board, wherein a two-way wireless communication link is established between the upper communication circuit board and the lower communication circuit board, and the lower communication circuit board is integrated with the lower circuit board;

the upper communication circuit board is arranged over the rotary shaft and is coupled to the upper circuit board; and an accommodating compartment matching the upper communication circuit board is provided at a bottom of the opto-mechanical rotor and is configured to accommodate the upper communication circuit board.

10. The lidar according to claim 1, wherein the receiving unit further comprises a filter arranged upstream of an optical path of the detector, and the filter is configured to select a detection echo in a predetermined wavelength range to be incident on the detector.

11. The lidar according to claim 1, wherein the detector comprises an avalanche photodiode; and the processing unit further comprises an amplifying circuit and an analog-to-digital converter, the amplifying circuit is coupled to the avalanche photodiode to amplify the electrical signal, and the analog-to-digital converter is coupled to the amplifying circuit to perform analog-to-digital conversion on the amplified electrical signal.

12. The lidar according to claim 1, wherein the detector comprises a SiPM or SPAD(s), the processing unit further comprises a time-to-digital converter, and the time-to-digital converter is coupled to the detector.

13. The lidar according to claim 1, wherein the laser emitter comprises an edge-emitting laser emitter or a vertical-cavity surface-emitting laser emitter.

14. The lidar according to claim 1, further comprising a set of receiving lenses, wherein the detector is arranged on a focal plane of the set of receiving lenses, and the set of receiving lenses is configured to focus the echo to the detector.

15. The lidar according to claim 14, wherein the emitting unit further comprises a set of emitting lenses, and the set of emitting lenses and the set of receiving lenses are fixed to an opto-mechanical rotor through an elastic piece assembly.

16. A ranging method by using a laser, comprising:

emitting detection laser beams through an emitting unit comprising a plurality of laser emitters and driving circuits;

changing a direction of a first part of the detection laser beams through a first reflecting portion;

changing a direction of a second part of the detection laser beams through a second reflecting portion of a compensation unit for a blind region so that a target object within a short range can receive the detection laser beams and reflected echoes can be received by detectors, the second reflecting portion being arranged in a non-parallel manner relative to the first reflecting portion;

receiving echoes from the target object through a plurality of detectors, converting the echoes into electrical signals;

reading the electrical signals outputted by the detectors through analog front-end components; and calculating the distance and/or reflectivity of the target object according to the electrical signals.

17. The ranging method by using a laser according to claim 16, further comprising:

rotating the emitting unit and the plurality of detectors around a rotary shaft.

18. The ranging method by using a laser according to claim 16, further comprising:

driving the plurality of laser emitters to emit light sequentially; and amplifying electrical signals outputted by different detectors according to a detection requirement of a lidar.

* * * * *